(12) United States Patent
Ryhman et al.

(10) Patent No.: US 8,060,991 B2
(45) Date of Patent: Nov. 22, 2011

(54) FIXING DEVICE FOR HOSE CLAMP

(75) Inventors: Morgan Ryhman, Anderstorp (SE); Lennart Andersson, Bredaryd (SE)

(73) Assignee: Norma Sweden AB, Anderstorp (SE)

(*) Notice: Subject to any disclaimer, the term of this patent is extended or adjusted under 35 U.S.C. 154(b) by 958 days.

(21) Appl. No.: 11/990,189

(22) PCT Filed: Sep. 4, 2006

(86) PCT No.: PCT/SE2006/001007
§ 371 (c)(1),
(2), (4) Date: Feb. 8, 2008

(87) PCT Pub. No.: WO2007/030059
PCT Pub. Date: Mar. 15, 2007

(65) Prior Publication Data
US 2009/0139062 A1 Jun. 4, 2009

(30) Foreign Application Priority Data
Sep. 6, 2005 (SE) .................................. 0501973

(51) Int. Cl.
*F16L 33/02* (2006.01)

(52) U.S. Cl. ....................... 24/274 R; 285/23
(58) Field of Classification Search ................ 24/20 LS, 24/20 R, 274 R; 285/23, 252, 253
See application file for complete search history.

(56) References Cited

U.S. PATENT DOCUMENTS

| | | | |
|---|---|---|---|
| 3,365,218 A * | 1/1968 | Denyes | 285/253 |
| 3,389,442 A * | 6/1968 | Tetzlaff | 285/252 |
| 3,407,448 A * | 10/1968 | Tetzlaff et al. | 285/253 |
| 3,454,996 A * | 7/1969 | Tetzlaff et al. | 24/283 |
| 3,668,744 A | 6/1972 | Moody et al. | |
| 5,368,337 A | 11/1994 | Torres | |
| 6,773,037 B2 * | 8/2004 | Spurgat | 285/23 |
| 2002/0060453 A1 * | 5/2002 | Spurgat | 285/23 |
| 2003/0188402 A1 | 10/2003 | Keller et al. | |
| 2004/0207195 A1 | 10/2004 | Bowater | |
| 2005/0052020 A1 | 3/2005 | Butler | |

FOREIGN PATENT DOCUMENTS

| | | |
|---|---|---|
| DE | 196 33 435 | 8/1996 |
| EP | 1 445 526 | 8/2004 |
| JP | 08-270854 | 10/1996 |
| JP | 10-78186 | 3/1998 |
| RU | 2 144 157 | 1/2000 |

(Continued)

OTHER PUBLICATIONS

English translation of Decision on Grant issued Feb. 27, 2010 for corresponding Russian Application No. 2008113193/06.

*Primary Examiner* — Robert Sandy
(74) *Attorney, Agent, or Firm* — Harness, Dickey & Pierce, P.L.C.

(57) ABSTRACT

A hose clamp (1) to be fastened to a hose (5), which hose clamp (1) comprises a band (2) which forms an open ring. The ends of the open ring are arranged adjacent to a locking portion (3), adjacent to which locking portion (3) a means (4) is arranged to vary the diameter of the ring and to hold the ends of the ring of the band together. Parts, which are substantially immovably connected to the locking portion (3), are arranged for fixed attachment to said hose (5).

11 Claims, 9 Drawing Sheets

FOREIGN PATENT DOCUMENTS

| | | |
|---|---|---|
| RU | 2 172 445 | 8/2001 |
| RU | 2 193 133 | 11/2002 |
| RU | 2 258 861 | 12/2004 |
| SE | 303 071 | 8/1968 |
| WO | WO 87/00256 | 1/1987 |
| WO | WO 00/31456 | 6/2000 |

* cited by examiner

FIXING DEVICE FOR HOSE CLAMP

FIELD OF THE INVENTION

A hose clamp to be fixed to a hose, which hose clamp comprises a band forming an open ring. The ends of the open ring are arranged adjacent to a locking portion, adjacent to which locking portion a means is arranged to vary the diameter of the ring and to hold the ends of the ring of the band together.

BACKGROUND ART

Hose clamps are frequently used, for instance to be mounted on a hose end in order to fasten/fix the hose to connecting components. Hose clamps are usually made of a band, the band, at the ends of the open ring, being closed by means of a locking portion and a clamping screw or clamping device.

In some cases, it is desirable to premount hose clamps on hoses in order to facilitate the final mounting of the hose. With loose, non-premounted hose clamps, the number of components and product numbers increases, which is perceived as a problem with hose clamps according to prior art technique in industrial contexts. Furthermore problems may rise in the orientation of the hose clamp and its clamping device. If the hose clamp is displaced in mounting, the tool and/or the clamping device of the hose clamp may get caught or become inaccessible.

SUMMARY OF THE INVENTION

The object of the present invention therefore is to at least partly eliminate the above problems. This object is achieved by a hose clamp of the type stated by way of introduction being given the features that are defined in claim 1. Further advantageous embodiments of this hose clamp are defined in the claims that are dependent on claim 1.

A first aspect of the present invention is a hose clamp to be fixed to a hose, which hose clamp comprises a band forming an open ring. The ends of the open ring are arranged adjacent to a locking portion, adjacent to which locking portion a means is arranged to vary the diameter of the ring and to hold the ends of the ring of the band together. Parts that are substantially immovably connected to the locking portion are arranged for fixed attachment to the hose.

An advantage of the present invention is that premounted hose clamps, which are fixedly attached to the hose, are capable of repeatedly orienting the hose clamps in the same manner in, for instance, an assembly-line mounting process. Moreover, with the hose clamp premounted, there is no risk of forgetting to mount a hose clamp before mounting the hose.

When the locking portion or neighbouring immovably connected parts are fixed to the hose, the locking portion remains in place while tightening the band ring with the aid of the clamping means. It is then an advantage that the locking portion and the clamping means are not moved during tightening since the spaces where hose clamps are mounted are frequently narrow, such as in engine compartments. As a result, by means of the invention it is possible to prevent the locking portion and the clamping means from being moved along the periphery of the hose during tightening. Therefore the locking portion also constitutes a suitable fastening point for other components, such as hoses, cables or flexible cords that can be fastened to the locking portion by means of a holder/attachment intended for the purpose.

In one embodiment of the invention, said fixing attachment of the hose clamp consists of a separate component which fixes the locking portion to said hose. The locking portion is kept fixed to the hose by means of a yoke-like attaching component.

In an alternative embodiment of the invention, the separate component, together with the wall portion of the hose, surrounds the locking portion of the hose clamp. Furthermore the locking portion of the hose clamp is attached to the hose by means of the separate polymer component by gluing, welding or some other type of attachment for the separate polymer component to the hose. For example, the separate component can be snapped on to the locking portion to be kept in place on the hose clamp until the component is attached to the hose to fix the locking portion to the hose.

In another alternative embodiment of the invention, the locking portion is also arranged with a fastening element for other surrounding components. Since the locking portion is fixed relative to the hose, the locking portion constitutes a suitable fastening point to fasten other surrounding components. With the aid of fastening elements, surrounding components are fastened to the hose clamp by spring action, that is elastically resilient metal bands formed to a suitable shape to fix surrounding components. The metal bands project from the locking portion and can also be designed to constitute attachment for other holding elements, for instance with holes for fastening strips.

In an alternative embodiment of the invention, the fixing attachment is integrated with the locking portion. The integrated fixing attachment is preferably made of metal, in one piece with said locking portion. The locking portion can be fastened with integrated teeth directly from the locking portion into the hose, or alternatively a projecting integral part of the locking portion is used to be folded around the material of the edge of the hose end in order to engage the hose material on the inside of the hose with retaining teeth.

In yet another alternative embodiment of the invention, the attachment of the hose clamp has an abutment for positioning the hose clamp relative to the end of the hose on which the hose clamp is mounted.

In additional embodiments, attachments are shown, which are integrated with the locking portion of the hose clamp, which attachments can be used to fasten surrounding components. In these embodiments, the hose clamp need not be fixedly fastened to the hose by means of teeth or a separate component as illustrated in other embodiments.

BRIEF DESCRIPTION OF THE DRAWINGS

The invention will now be described in more detail with reference to the accompanying drawings which by way of example illustrate different embodiments of the invention.

DESCRIPTION OF PREFERRED EMBODIMENTS

For exemplification purposes, the invention will now be described in more detail by means of embodiments and with reference to the accompanying drawings.

Figure 1A:
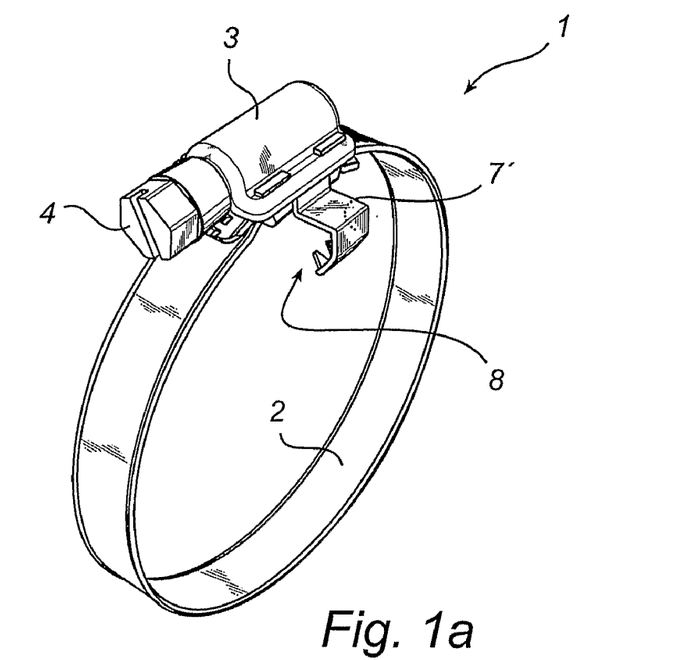
FIGS. 1a and 1b are perspective views of a hose clamp according to the invention, integrally fastened to the locking portion.
Figure 1B:
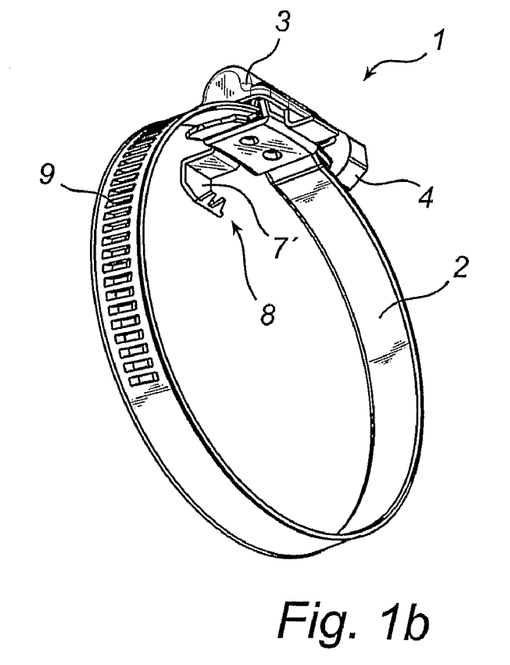

In a first embodiment in FIGS. 1a-b of a hose clamp 1 according to the invention, the hose clamp 1 comprises a locking portion 3 for adjusting, by means of a clamping screw 4, the diameter of the band 2 by the clamping screw 4 cooperating with grooves 9 in the band 2 so that, as the screw 4 rotates, clockwise of counter-clockwise, the enclosing diameter of the band 2 decreases or increases. The hose clamp is positioned on a hose, by means of the abutment 7', at a distance from the end of the hose which is determined by the abutment 7', after which the material of the attachment 8 is bent so that the two teeth of the attachment are moved towards the locking portion 3 in order to engage the material on the inside of the hose 5, whereby the locking portion 3 and the hose clamp 1 are fixed to the hose 5. The attachment 8 is made of the same sheet metal material as the locking portion 3, and the attachment 8 can advantageously be made integrated with the locking portion 3.

Figure 2A:
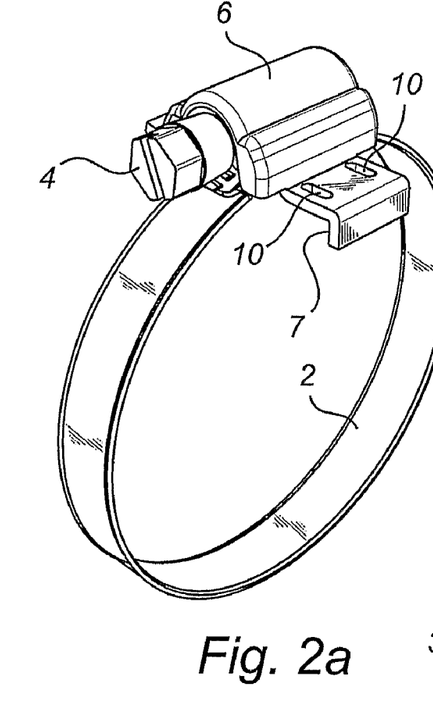
FIGS. 2a and 2b are perspective views of a hose clamp according to the invention with a separate component for fastening the locking portion.
Figure 2B:
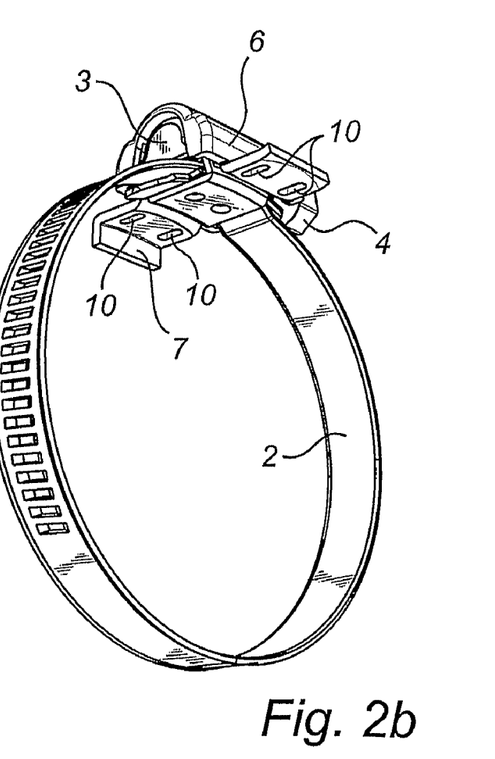
Figure 3:
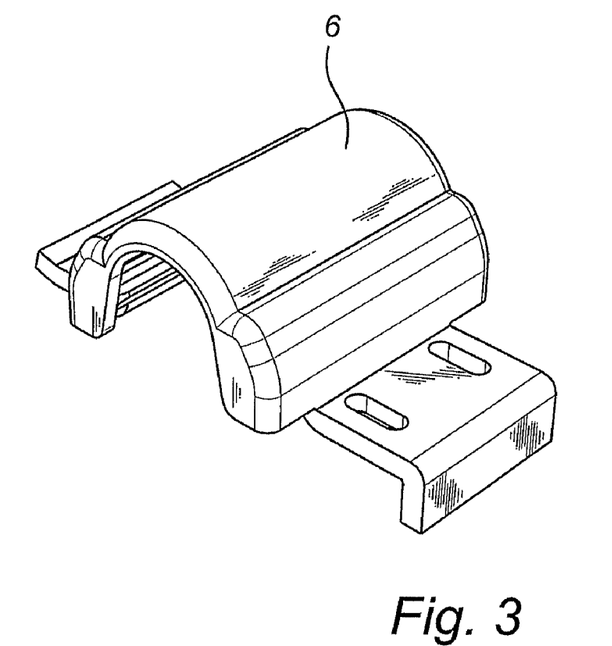
FIG. 3 is a perspective view of the separate component for fastening the locking portion of the hose clamp.

FIGS. 2a-b illustrate a hose clamp 1 according to the invention for premounted fixing of the hose clamp 1 to the hose 5. In this embodiment, fixing of the hose clamp 1 to the hose 3 occurs by means of the plastic component 6 which is snapped over the locking portion 3 by spring action due to the design of the separate plastic component and internal hooks (not shown) which snap over the edge portions of the locking portion 3. In this manner, the attaching component 6 is fixed to the locking portion 3 of the hose clamp until the hose clamp 1 is premounted on the hose 5 by means of the separate plastic component 6. The separate component 6 is attached on both sides of the locking portion 3 on the outer wall portion of the hose, for example by gluing or welding, and in this way the hose clamp 1 is fastened to the hose 5. When the plastic component 6 is fastened as a yoke over the locking portion, the locking portion and rigidly connected parts of the hose clamp are prevented from moving relative to the hose. Abutments (not shown) inside the plastic component 6 cooperate with the locking portion 3 and prevent the locking portion 3 from moving in the peripheral direction.

In the embodiment where the plastic component 6 is used to premount the hose clamp by gluing, the holes 10 are used to establish a strong mechanical joint between the plastic component 6 and the hose 5. The inner sides of the holes 10 have a geometry so that the cross-sectional surface of the hole increases away from the outer circumferential surface of the hose 5. When applying adhesive between the component 6 and the outer circumferential surface of the hose and pressing the components together, adhesive is driven up in the conical holes 10, after which the adhesive solidifies and locks the component 6 mechanically due to the conical shape of the holes 10, which mechanically prevents the component 6 from coming loose. With this method of joining, the adhesive joint's chemical bond between the component and the adhesive is not the primary matter.

Moreover, with the two embodiments as illustrated in FIGS. 1 and 2 the locking portion 3 is prevented from being moved in the peripheral direction while actuating the clamping screw to adjust the diameter of the band 2, because the premounted attachment 6, 8 fixes the locking portion relative to the hose 5.

Figure 4:
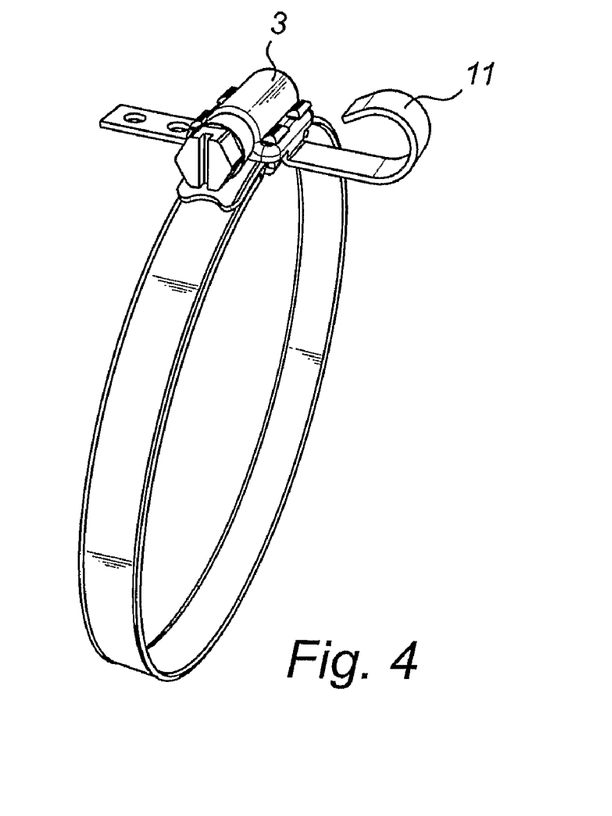
FIG. 4 is a perspective view of a hose clamp with an integrated fastening element on the locking portion.
Figures 5, 6:
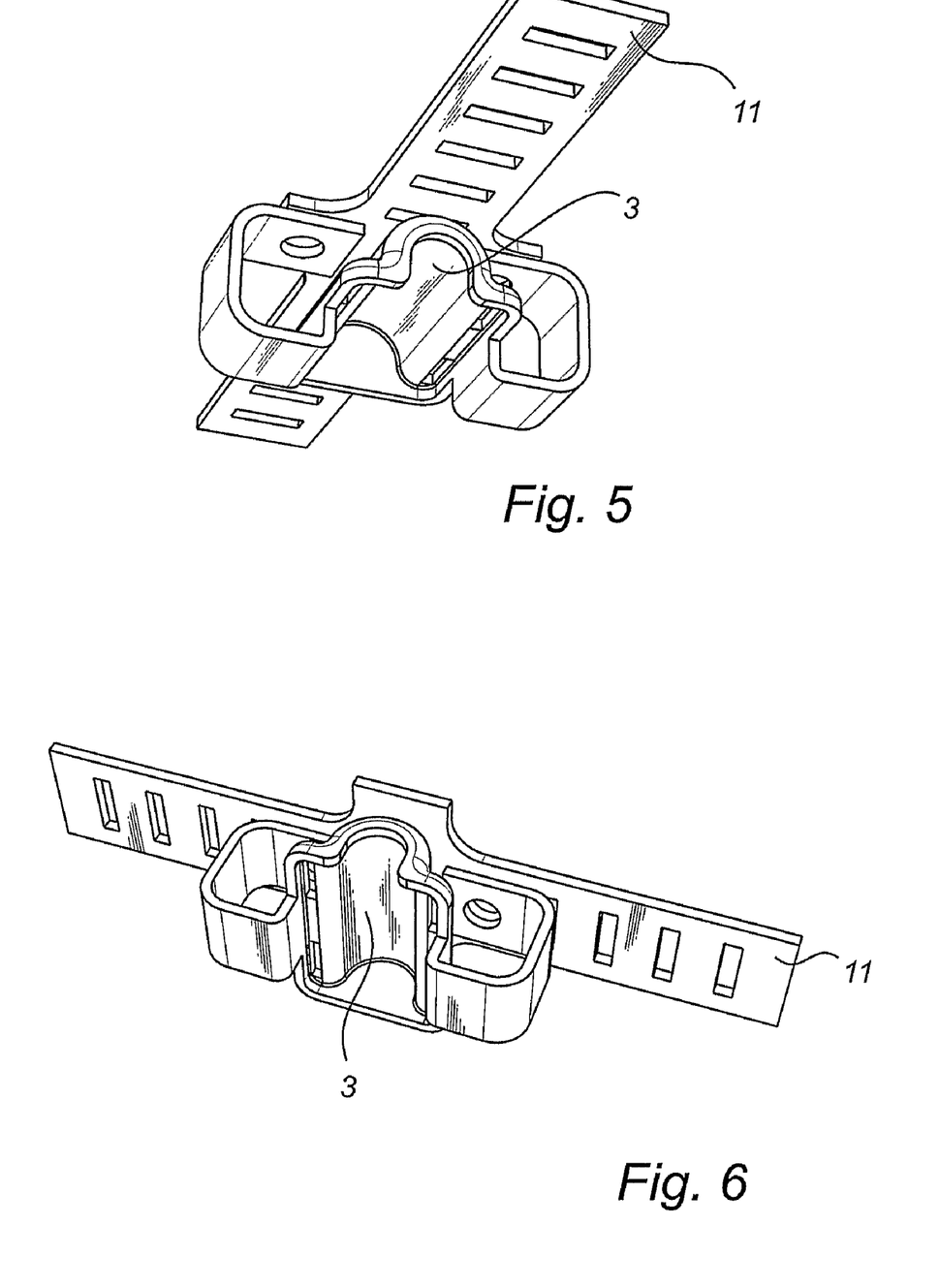
FIGS. 5-6 are perspective views of part of a locking portion with an integrated fastening element in combination with a component for mounting a fastening strip for instance.
Figure 7:
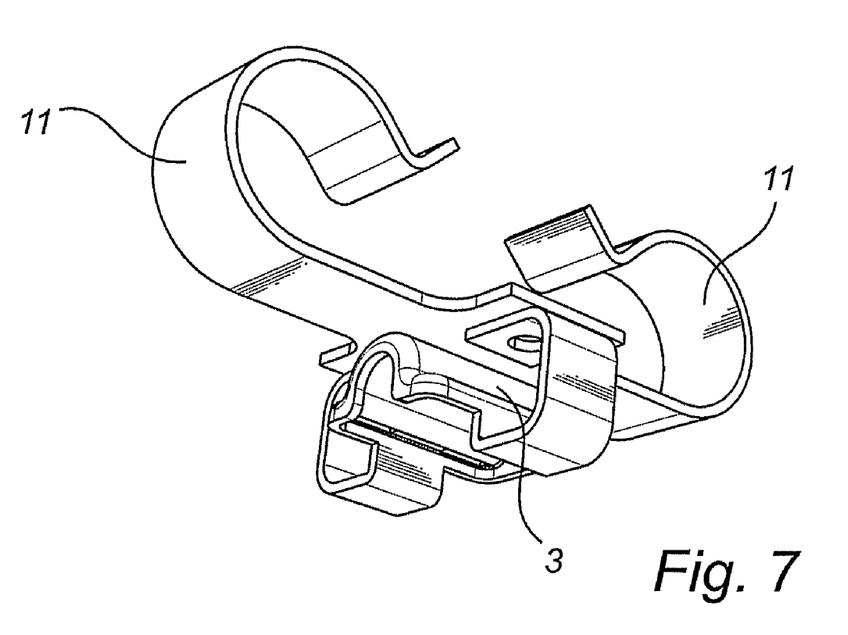
FIG. 7-8 are perspective views of part of a locking portion with alternative embodiments of an integrated and/or combined fastening element.
Figure 8:
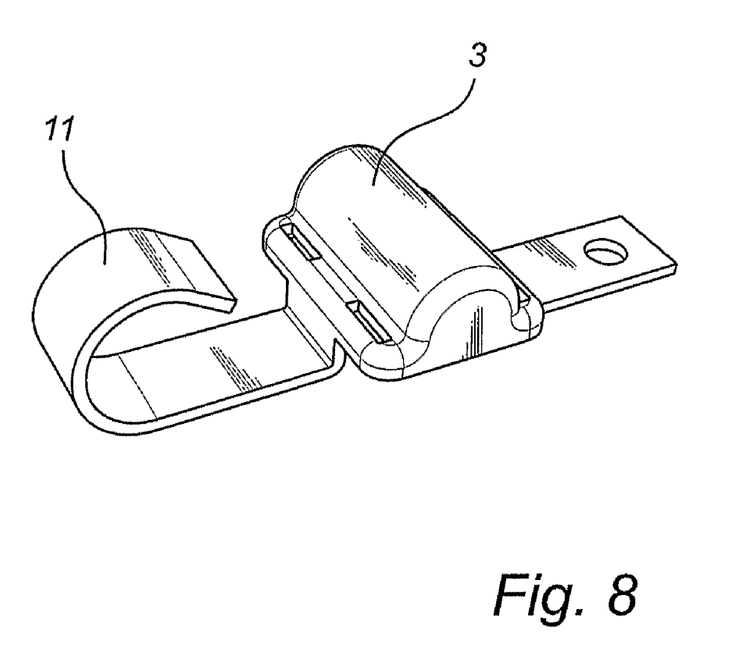
Figure 9:
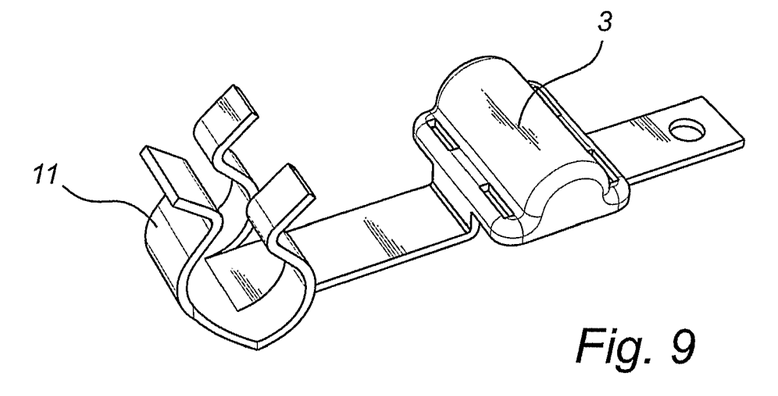
FIG. 9-15 are perspective views of part of a locking portion with further alternative embodiments of integrated fastening elements.
Figure 10:
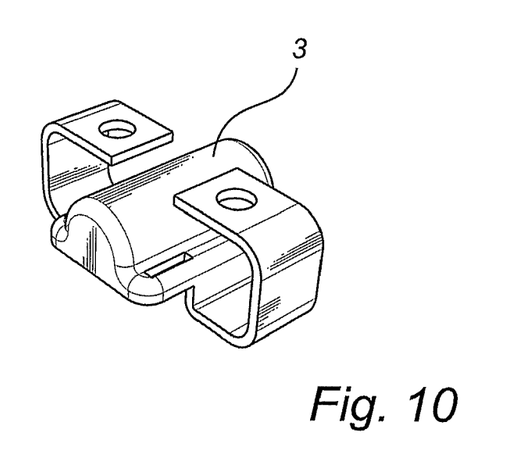
Figure 11:
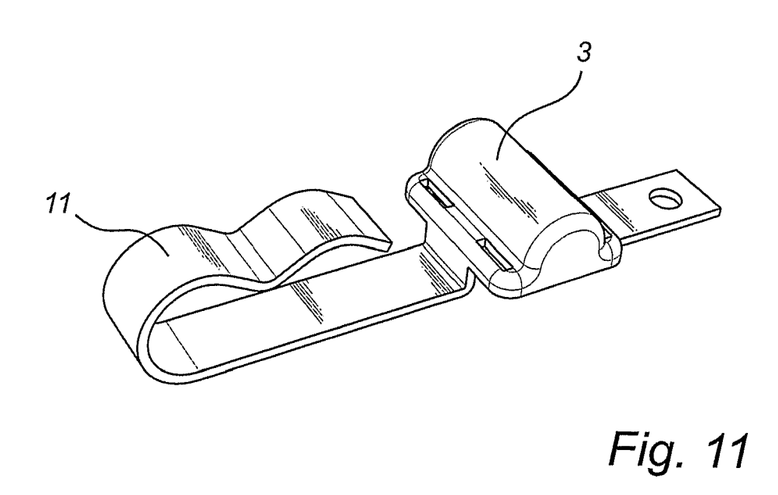
Figure 12:
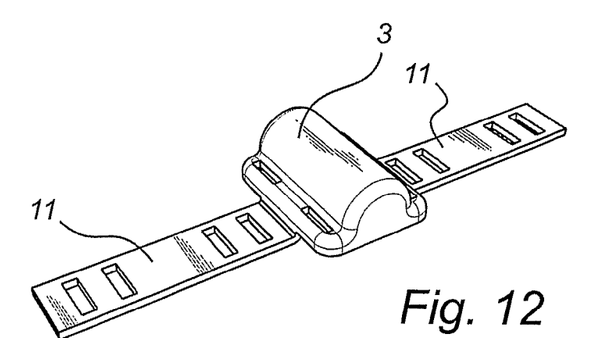
Figure 13:
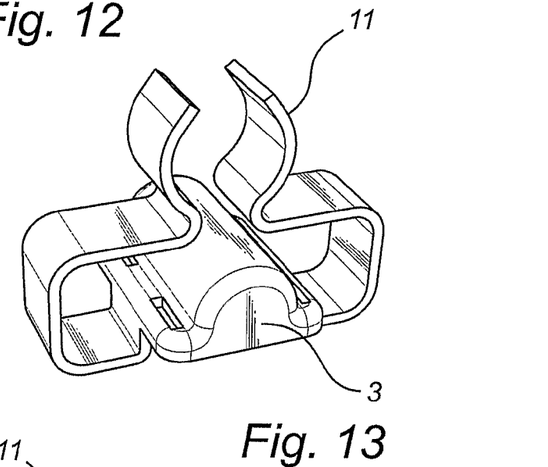
Figure 14:
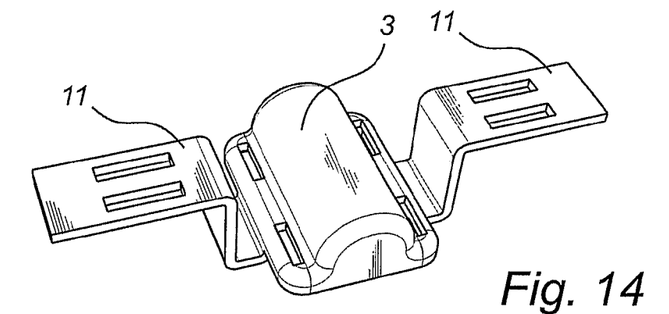
Figure 15:
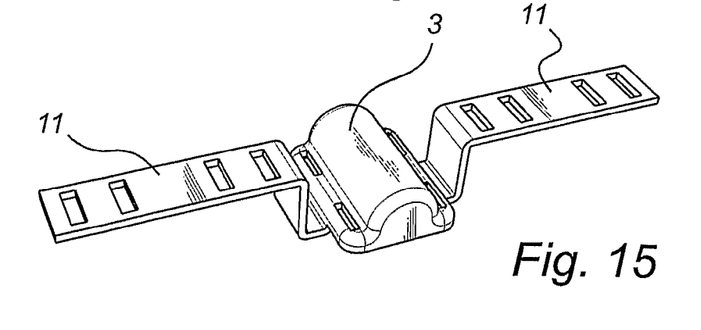
Figure 16:
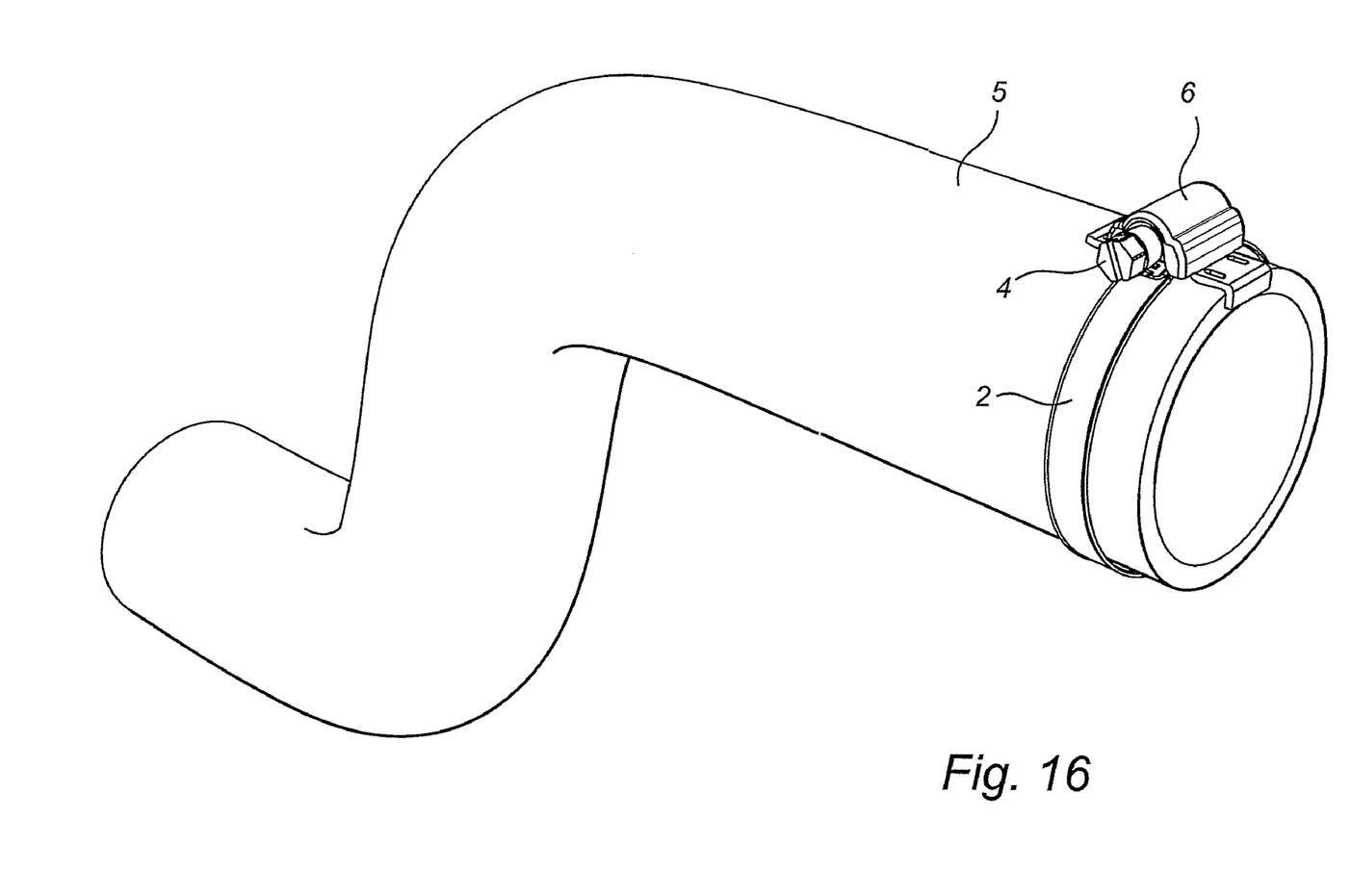
FIG. 16 is a perspective view of a hose clamp according to the invention arranged on a hose.
Figure 17:
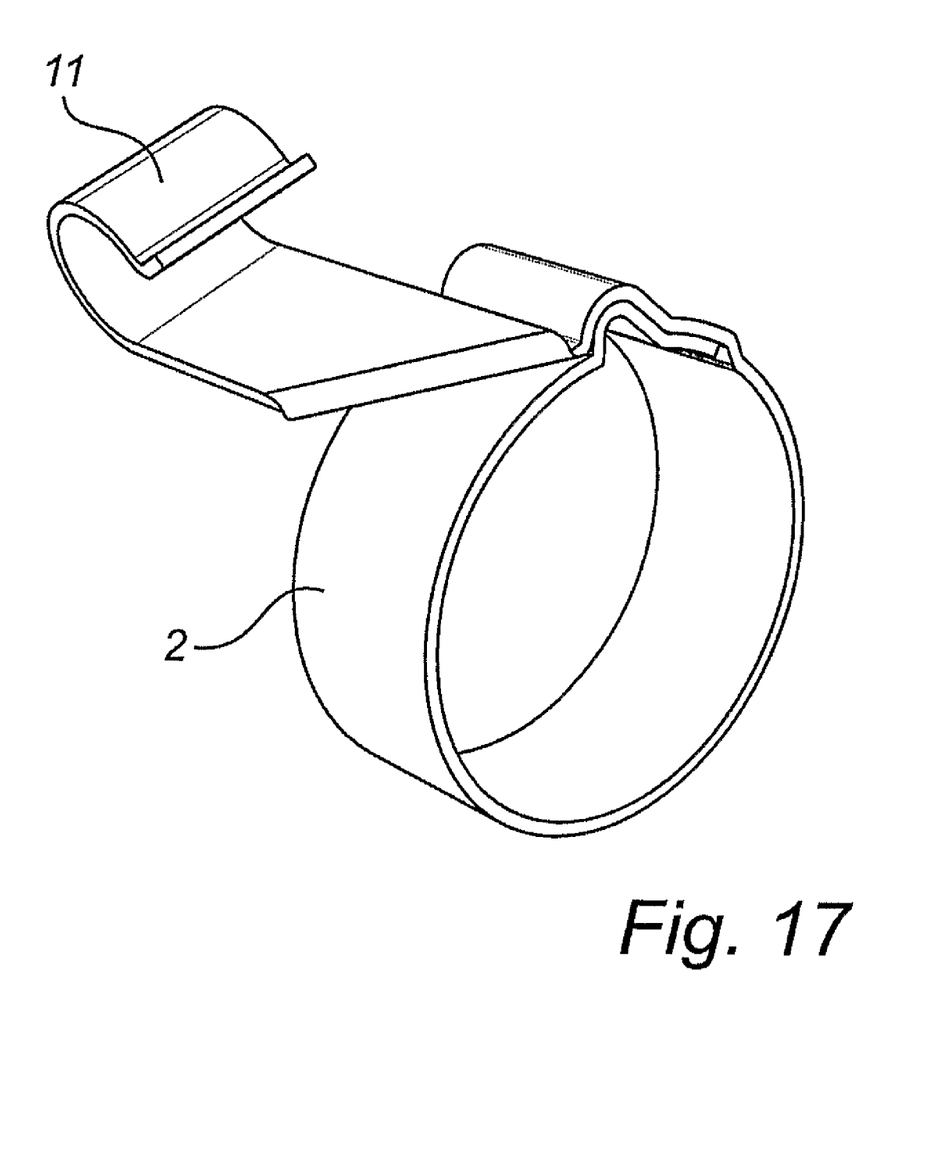
FIG. 17 is a perspective view of an alternative embodiment of a hose clamp according to the present invention.

FIGS. 4, 7 and 8 illustrate embodiments of a hose clamp with an attachment for wiring for instance, and the bent metal sheet can resiliently snap around a cable or alternatively be bent around a cable to retain it. In the above-mentioned latter embodiments and in the following embodiments, the purpose is not that the hose clamp should be fixedly fastened to a hose but only be clamped around the hose by tightening the hose clamp. It is evident from FIGS. 9, 11 and 13 how integrated attachments can be designed in order to resiliently hold elongate objects such as pipes, cables, and hoses.

FIGS. 5, 6, 12, 14 and 15 illustrate locking portions with integrated fixing holes for fastening strips or other fastening elements adapted to fix components, for instance, in an engine compartment.

The invention claimed is:

1. A hose clamp to be fastened to a hose, said hose clamp comprising a band forming an open ring, ends of the open ring being arranged adjacent to a locking portion, and a device, arranged adjacent to the locking portion, to vary a diameter of the open ring and to hold the ends of the open ring of the band together, wherein parts for fixed attachment, which are substantially immovably connected to the locking portion, are arranged to fixedly attach to said hose, said parts for fixed attachment being further integrated with the locking portion and made in one piece with said locking portion.

2. A hose clamp as claimed in claim 1, wherein said locking portion is arranged with a fastening element for other surrounding components.

3. A hose clamp as claimed in claim 2, wherein said fastening element fastens surrounding components to the hose clamp via a spring action.

4. A hose clamp as claimed in claim 2, wherein said fastening element is arranged to fasten elongate components to the hose clamp.

5. A hose clamp as claimed in claim 1, wherein said parts for fixed attachment has an abutment for positioning the hose clamp relative to an end of the hose on which the hose clamp is mounted.

6. A hose clamp to be fastened to a hose, said hose clamp comprising a band forming an open ring, ends of the open ring being arranged adjacent to a locking portion, and a device, arranged adjacent to the locking portion, to vary a diameter of the open ring and to hold the ends of the open ring of the band together, wherein parts for fixed attachment, which are substantially immovably connected to the locking portion, are arranged to fixedly attach to said hose, said parts for fixed attachment include a separate component which fixes the locking portion to said hose, and wherein said parts for fixed attachment has an abutment for positioning the hose clamp at a distance to an end of the hose on which the hose clamp is mounted.

7. A hose clamp as claimed in claim 6, wherein said separate component, together with a wall portion of the hose, surrounds the locking portion of the hose clamp, said separate component being attached to an outer wall portion of the hose.

8. A hose clamp as claimed in claim 6, wherein said separate component is made of a polymer material.

9. A hose clamp as claimed in claim 6, wherein said locking portion is arranged with a fastening element for other surrounding components.

10. A hose clamp as claimed in claim 9, wherein said fastening element fastens surrounding components to the hose clamp via a spring action.

11. A hose clamp as claimed in claim 9, wherein said fastening element is arranged to fasten elongate components to the hose clamp.

* * * * *